United States Patent
Juneja

(10) Patent No.: US 10,492,378 B2
(45) Date of Patent: Dec. 3, 2019

(54) VERTICALLY ORIENTED PORTABLE PLANTER SYSTEM

(71) Applicant: David K. Juneja, Largo, FL (US)

(72) Inventor: David K. Juneja, Largo, FL (US)

( * ) Notice: Subject to any disclaimer, the term of this patent is extended or adjusted under 35 U.S.C. 154(b) by 141 days.

(21) Appl. No.: 15/696,824

(22) Filed: Sep. 6, 2017

(65) Prior Publication Data
US 2018/0077876 A1    Mar. 22, 2018

Related U.S. Application Data

(60) Provisional application No. 62/397,066, filed on Sep. 20, 2016.

(51) Int. Cl.
| *A01G 9/02* | (2018.01) |
| *A01G 9/20* | (2006.01) |
| *A01G 9/24* | (2006.01) |
| *A01G 31/06* | (2006.01) |

(52) U.S. Cl.
CPC ............... *A01G 9/023* (2013.01); *A01G 9/20* (2013.01); *A01G 9/247* (2013.01); *A01G 31/06* (2013.01)

(58) Field of Classification Search
CPC .......... A01G 9/023; A01G 9/20; A01G 9/247; A01G 31/06
See application file for complete search history.

(56) References Cited

U.S. PATENT DOCUMENTS

| 7,886,482 | B2 * | 2/2011 | DiMaggio | A47G 7/041 47/39 |
| 8,245,443 | B1 * | 8/2012 | Caruso | A01G 9/027 211/85.23 |
| 8,438,781 | B2 * | 5/2013 | Zhao | A01G 9/025 47/82 |
| 2009/0223126 | A1 * | 9/2009 | Garner | E04F 13/081 47/66.7 |
| 2011/0258925 | A1 * | 10/2011 | Baker | A01G 9/023 47/65.8 |

FOREIGN PATENT DOCUMENTS

| DE | 3415911 A1 * | 10/1985 | ............ A01G 9/022 |
| GB | 2477303 B   * | 12/2013 | ............ A01G 9/022 |
| NL | 1003831 C2 * | 2/1998 | ............ A01G 9/025 |

* cited by examiner

Primary Examiner — Joshua D Huson

(57) ABSTRACT

A planter system has similarly configured left and right sides, a top edge, a bottom edge, a front edge, a rear edge, a first surface, and a second surface. A rear plate assembly is formed of a plurality of rear plates coupled in a vertical plane between the sides adjacent to the rear edges to hold the sides in parallel vertical planes. A shelf plate assembly is formed of a plurality of shelf plates coupled in elevationally spaced parallel planes between the sides to hold the sides in parallel vertical planes. A base has a bottom positionable on a floor and has a top receiving and supporting the sides adjacent to the bottom edges.

1 Claim, 6 Drawing Sheets

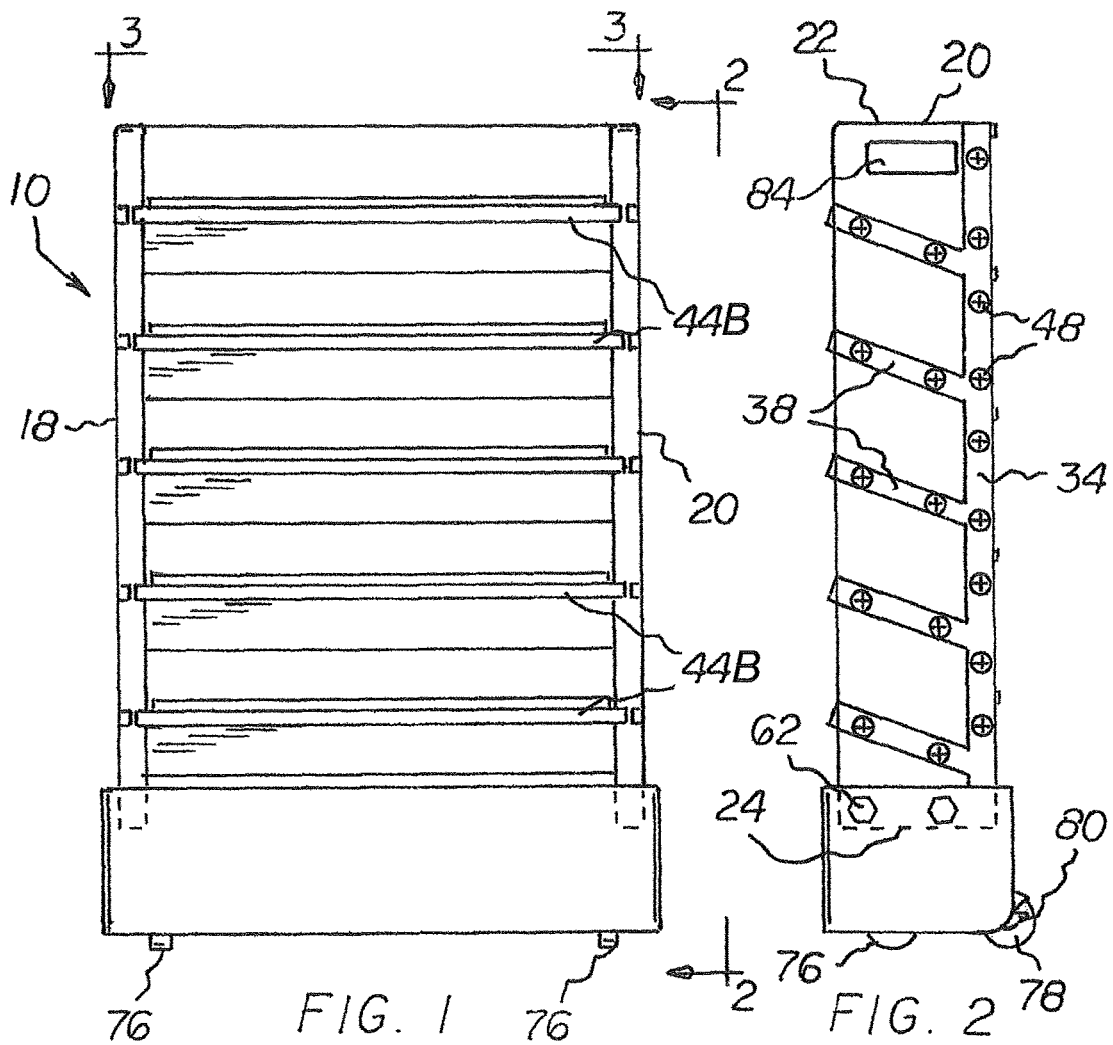
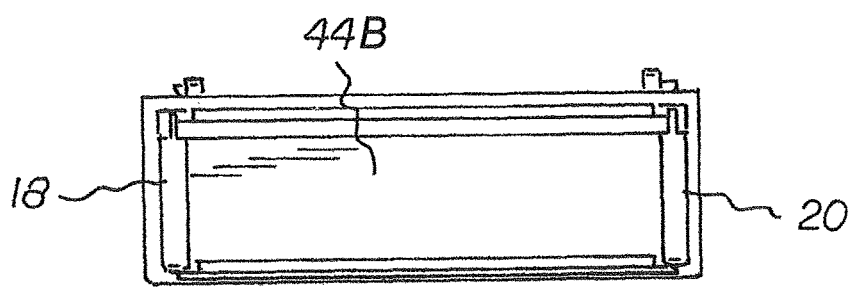
FIG. 1  FIG. 2  FIG. 3

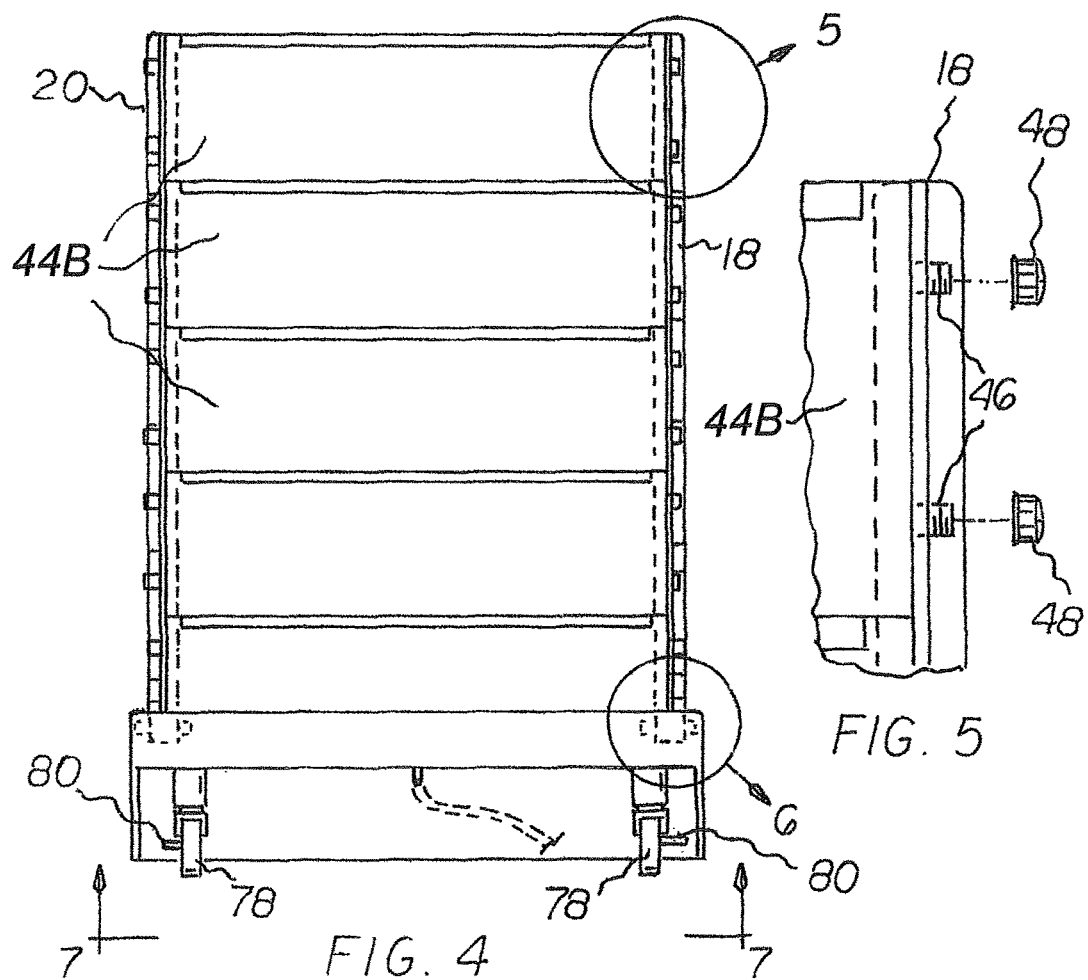
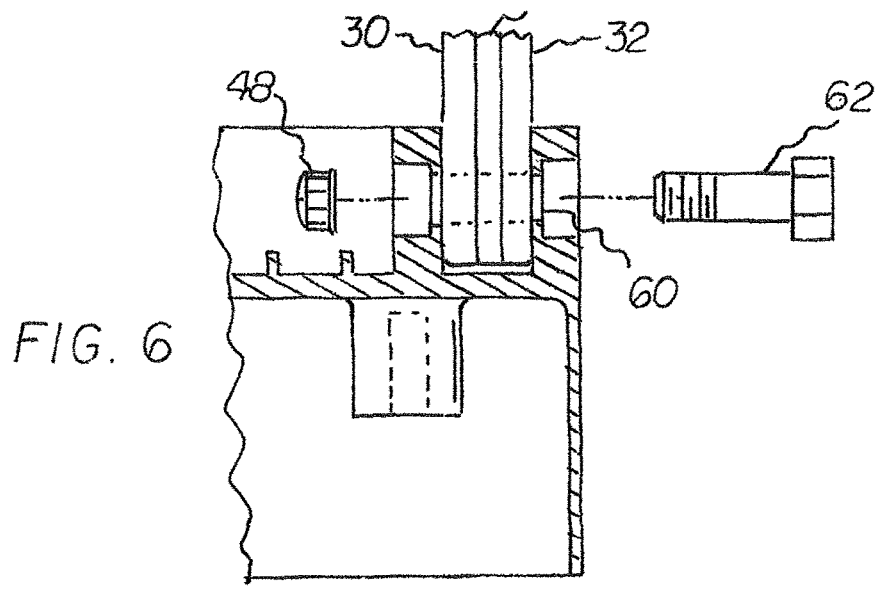

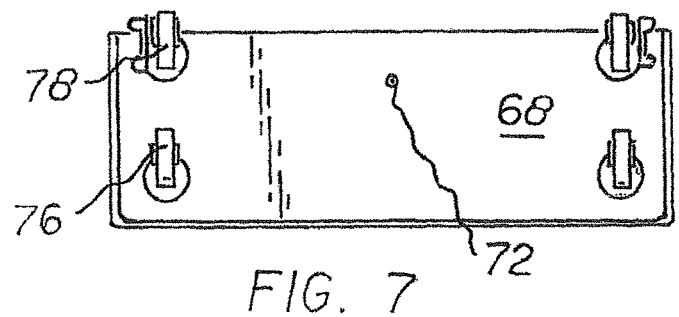
FIG. 7
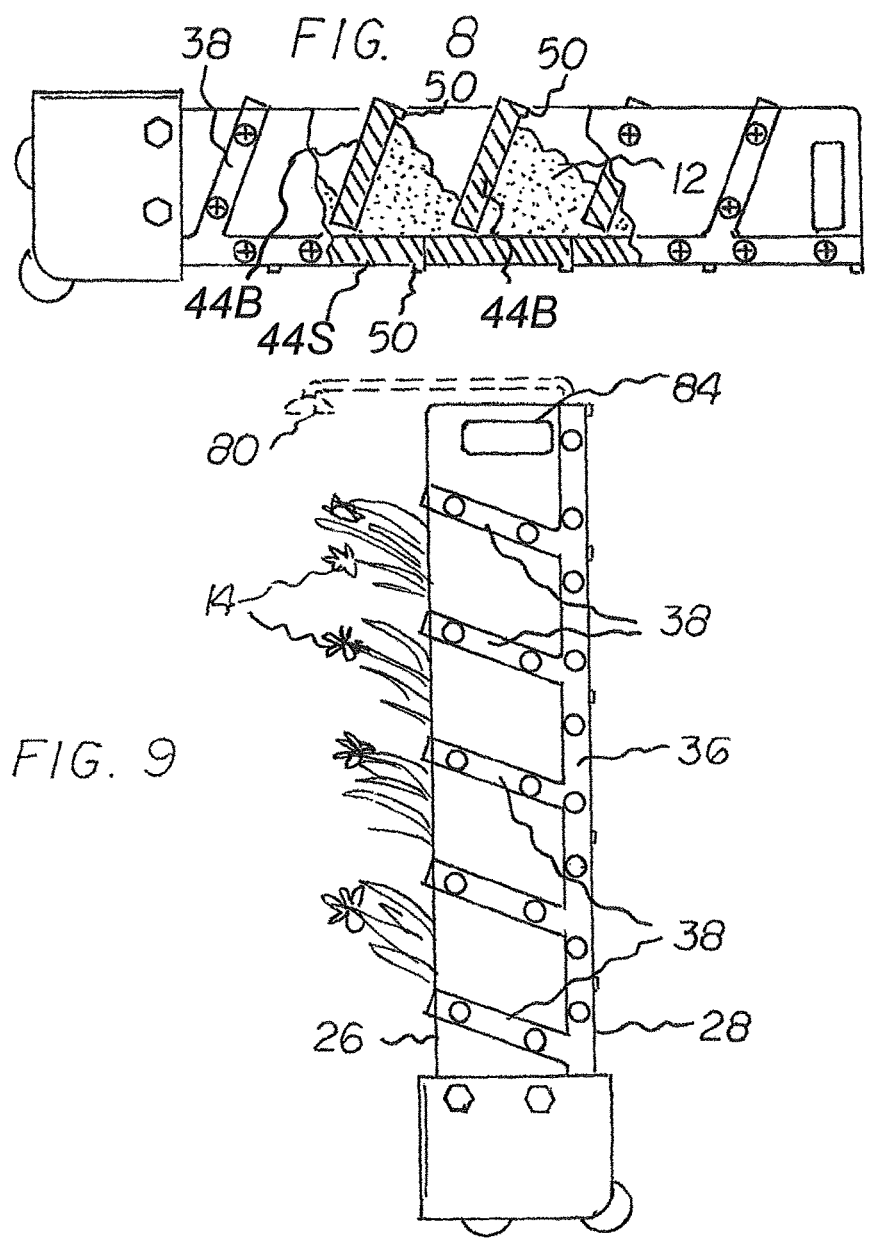
FIG. 8
FIG. 9

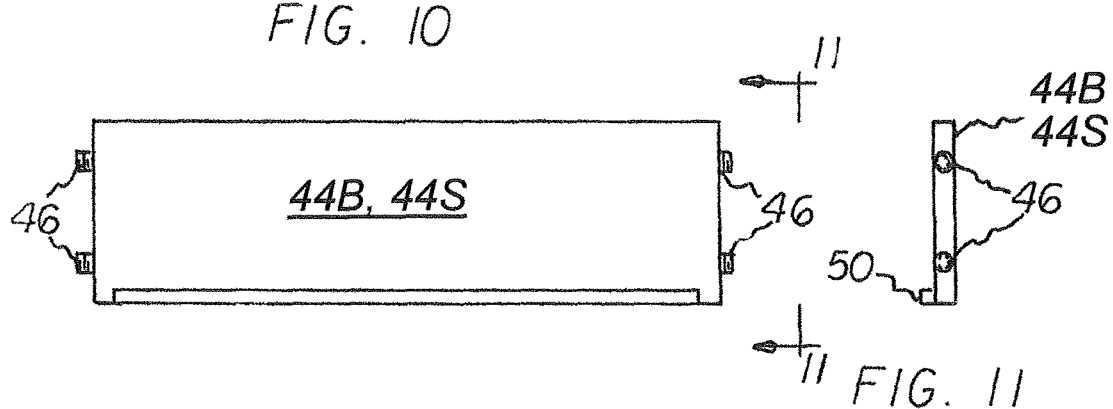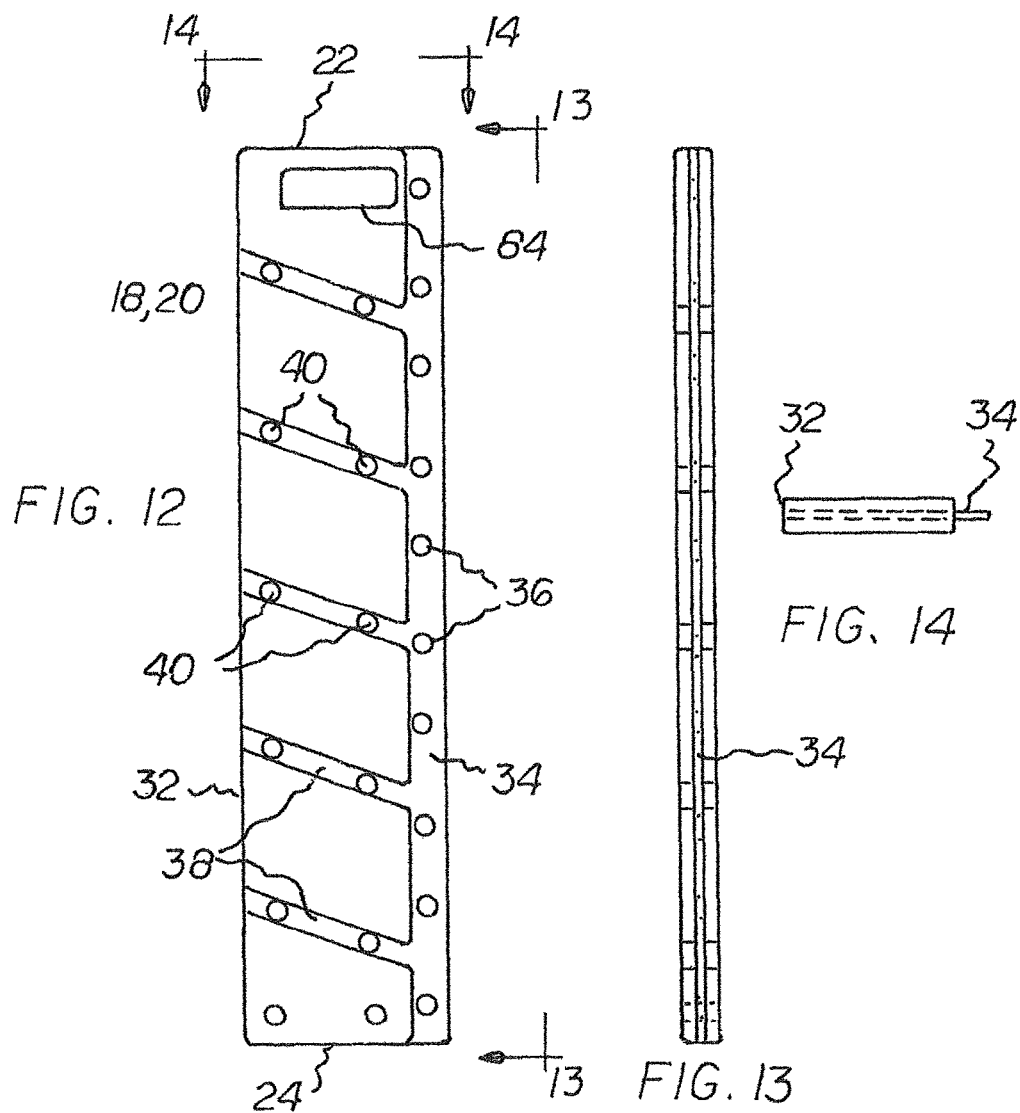

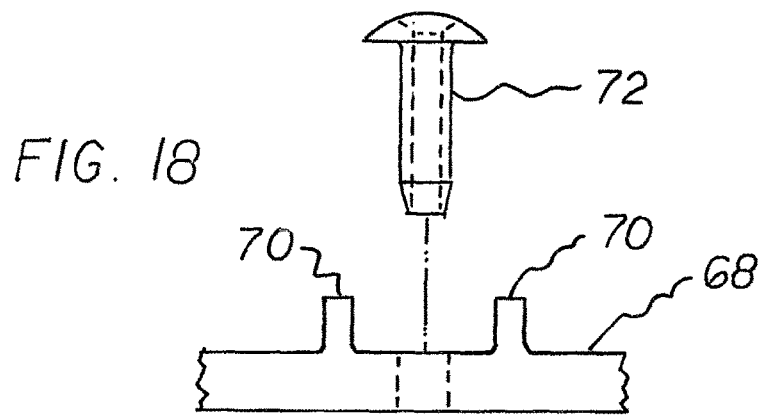
FIG. 18
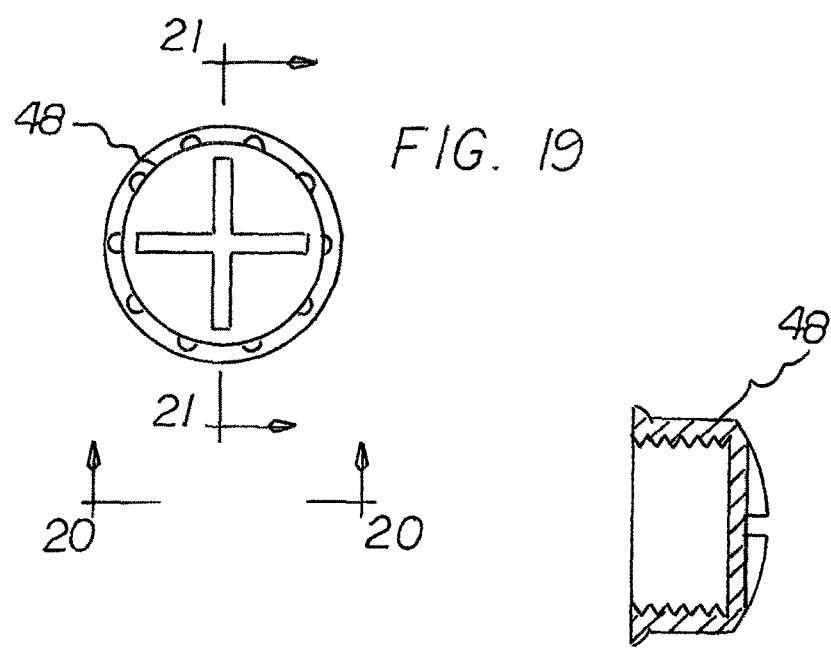
FIG. 19
FIG. 21
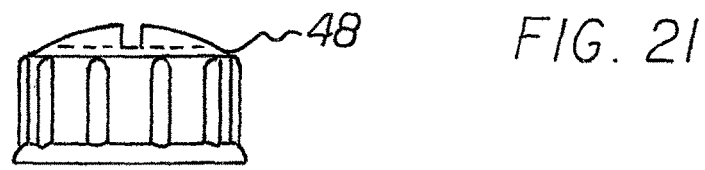
FIG. 20

VERTICALLY ORIENTED PORTABLE PLANTER SYSTEM

RELATED APPLICATION

The present application is based upon Provisional Application No. 62/397,066 filed Sep. 20, 2016, the subject matter of which is incorporated herein by reference and the priority of which is hereby claimed.

BACKGROUND OF THE INVENTION

Field of the Invention

The present invention relates to a vertically oriented portable planter system and more particularly pertains to growing plants in soil, for tilting the system between growing and planting orientations, and for transporting the system between various locations, all in a safe, convenient, and economical manner.

Description of the Prior Art

The use of planter systems of known designs and configurations is known in the prior art. More specifically, planter systems of known designs and configurations previously devised and utilized for the purpose of planting and growing plants in soil are known to consist basically of familiar, expected, and obvious structural configurations, notwithstanding the myriad of designs encompassed by the crowded prior art which has been developed for the fulfillment of countless objectives and requirements.

While these devices fulfill their respective, particular objectives and requirements, they do not describe a vertically oriented portable planter system that allows growing plants in soil, for tilting the system between growing and planting orientations, and for transporting the system between various locations, all in a safe, convenient, and economical manner.

In this respect, the vertically oriented portable planter system according to the present invention substantially departs from the conventional concepts and designs of the prior art, and in doing so provides an apparatus primarily developed for the purpose of growing plants in soil, for tilting the system between growing and planting orientations, and for transporting the system between various locations, all in a safe, convenient, and economical manner.

Therefore, it can be appreciated that there exists a continuing need for a new and improved vertically oriented portable planter system which can be used for growing plants in soil, for tilting the system between growing and planting orientations, and for transporting the system between various locations, all in a safe, convenient, and economical manner. In this regard, the present invention substantially fulfills this need.

SUMMARY OF THE INVENTION

In view of the disadvantages inherent in the known types of planter systems of known designs and configurations now present in the prior art, the present invention provides an improved vertically oriented portable planter system. As such, the general purpose of the present invention, which will be described subsequently in greater detail, is to provide a new and improved vertically oriented portable planter system and method which has all the advantages of the prior art and none of the disadvantages.

To attain this, from a broad perspective, the present invention essentially comprises a vertically oriented portable planter system. First provided are similarly configured left and right sides. Each side has a top edge, a bottom edge, a front edge, a rear edge, a first surface and a second surface. Next provided is a rear plate assembly formed of a plurality of rear plates. The rear plates are coupled in a vertical plane between the sides adjacent to the rear edges to hold the sides in parallel vertical planes. Next, a shelf plate assembly formed of a plurality of shelf plates is provided. The shelf plates are coupled in elevationally spaced parallel planes between the sides to hold the sides in parallel vertical planes. Lastly, a base is provided. The base has a bottom and a top. The bottom is positionable on a floor. The top receives and supports the sides adjacent to the bottom edges.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved vertically oriented portable planter system which has all of the advantages of the prior art planter systems of known designs and configurations and none of the disadvantages.

It is another object of the present invention to provide a new and improved vertically oriented portable planter system which may be easily and efficiently manufactured and marketed.

It is a further object of the present invention to provide a new and improved vertically oriented portable planter system which is of durable and reliable constructions.

An even further object of the present invention is to provide a new and improved vertically oriented portable planter system which is susceptible of a low cost of manufacture with regard to both materials and labor, and which accordingly is then susceptible of low prices of sale to the consuming public, thereby making such vertically oriented portable planter system economically available to the buying public.

Lastly, another object of the present invention is to provide a vertically oriented portable planter system for growing plants in soil, for tilting the system between growing and planting orientations, and for transporting the system between various locations, all in a safe, convenient, and economical manner.

These together with other objects of the invention, along with the various features of novelty which characterize the invention, are pointed out with particularity in the claims annexed to and forming a part of this disclosure.

For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a front elevational view of a vertically oriented portable planter system constructed in accordance with the principles of the present invention.

FIG. 2 is a side elevational view of the system taken along line 2-2 of FIG. 1.

FIG. 3 is a plan view of the system taken along line 3-3 of FIG. 1.

FIG. 4 is a rear elevational view of the system shown in the prior Figures;

FIG. 5 is an enlarged rear elevational illustration of the upper extent of the system taken at circle 5 of FIG. 4.

FIG. 6 is an enlarged rear elevational illustration of the lower extent of the system taken at circle 6 of FIG. 4

FIG. 7 is a bottom view taken along line 7-7 of FIG. 4.

FIG. 8 is a side elevational view, partly in cross section, showing the system during planting.

FIG. 9 is a side elevational view showing the system during growing and watering.

FIG. 10 is a plan view of one of the plates shown in the prior Figures.

FIG. 11 is an end elevational view taken along line 11-11 of FIG. 10

FIG. 12 is a plan view of one of the sides shown in the prior Figures.

FIG. 13 is a rear elevational view taken along line 13-13 of FIG. 12.

FIG. 14 is a plan view taken along line 14-14 of FIG. 12.

FIG. 18 is an enlarged exploded view of the drainage element taken at circle 18 of FIG. 16.

FIG. 19 is a plan view of a multi-purpose nut of the Figures.

FIG. 20 is a side elevational view taken along line 20-20 of FIG. 19.

FIG. 21 is a cross sectional view taken along line 21-21 of FIG. 19.

The same reference numerals refer to the same parts throughout the various Figures.

DESCRIPTION OF THE PREFERRED EMBODIMENT

Figure 15:
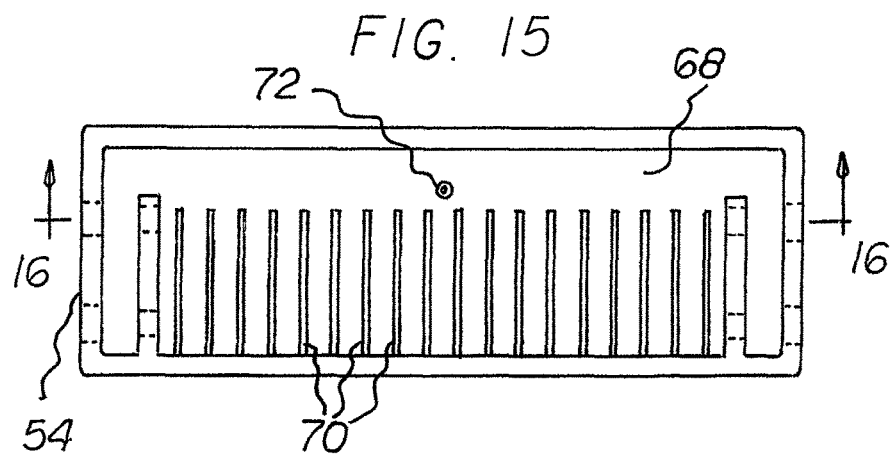
FIG. 15 is a plan view of the base shown in the prior Figures.
Figure 16:
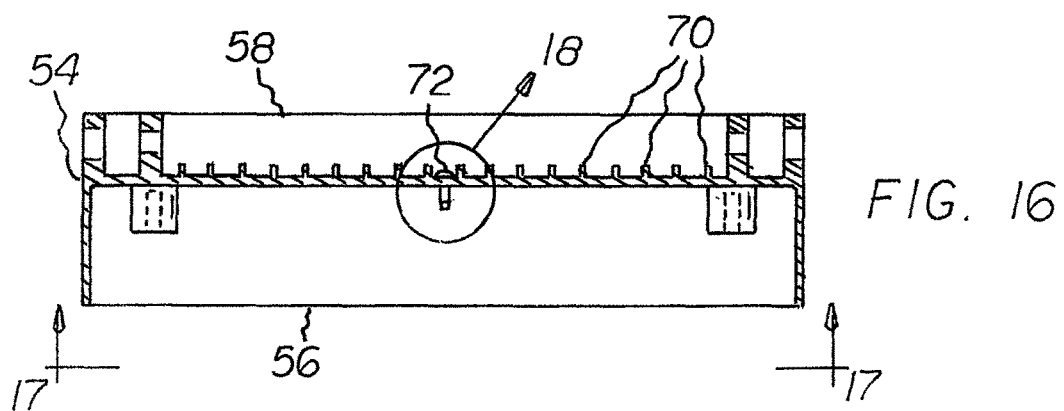
FIG. 16 is a cross sectional view taken along line 16-16 of FIG. 15.
Figure 17:
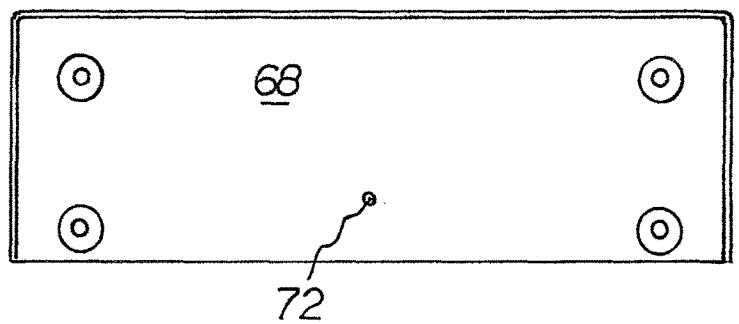
FIG. 17 is a bottom view taken along line 17-17 of FIG. 16.

With reference now to the drawings, and in particular to FIG. 1 thereof, the preferred embodiment of the new and improved vertically oriented portable planter system embodying the principles and concepts of the present invention and generally designated by the reference numeral 10 will be described.

The present invention, the vertically oriented portable planter system 10 is comprised of a plurality of components. Such components in their broadest context include a similarly configured right and left sides, a rear plate assembly, a shelf plate assembly, and a base. Such components are individually configured and correlated with respect to each other so as to attain the desired objective.

The vertically oriented portable planter system 10 is for growing plants 12 in soil 14, for tilting the system between growing and planting orientations, and for transporting the system between various locations. The growing, tilting, and transporting are done in a safe, convenient, and economical manner.

First provided in the preferred embodiment are a left side 18 and a similarly configured right side 20. Each side has a top edge 22, a bottom edge 24, a front edge 26, a rear edge 28, a first surface 30 and a second surface 32. A vertical recess 34 is provided in the first and second surfaces of each side adjacent to the rear edge. Each vertical recess has a plurality of pairs of elevationally spaced aligned holes 36. A plurality of elevationally spaced, parallel, angled recesses 38 are provided in the first and second surfaces of each side adjacent to the rear edge. Each angled recess has a pair of laterally spaced aligned holes 40. Each side is a laminate formed of an interior component with apertures and exterior components with apertures and recesses.

Next provided is a rear plate assembly. The rear plate assembly is formed of a plurality of rear plates 44B coupled together in a common vertical plane between the sides adjacent to the rear edges to hold the sides in parallel vertical planes.

A shelf plate assembly is next provided. The shelf plate assembly is formed of a plurality of shelf plates 44S. The shelf plates are coupled in elevationally spaced parallel planes between the sides to hold the sides in parallel vertical planes. The shelf plates extend from adjacent to the rear edges forwardly and upwardly at an acute angle to the front edges. Each of the plurality of rear plates and each of the plurality of shelf plates are of an identical construction formed and formed with laterally spaced end edges. Two threaded projections 46 extending through the apertures of the recesses are secured with multi-functional nuts 48. Each of the plurality of rear plates and each of the plurality of shelf panels also have a lip 50 protruding from an edge between the end edges. The shelf plates are spaced from the rear plates allowing for the flow of water there between.

Next provided is a base 54. The base has a bottom 56 and a top 58. The bottom is positionable on a floor. The top receives and supports the sides adjacent to the bottom edges. Lower apertures 60 extend through the base and the sides. Bolts 62 extending through the lower apertures. Multifunctional nuts 48 secure the bolts in position.

Horizontal shelving 68 is next provided. The horizontal shelving has upwardly extending projections 70 providing for storage of gardening tools. A drain member 72 extends through the shelving.

Next, a transportation assembly is provided. The transportation assembly is formed of a pair of laterally spaced front casters 76 and a pair of laterally spaced rear casters 78. The front and rear casters include wheels rotatably coupled to the base and extending beneath the base. The rear casters include brakes 80.

A watering assembly 84 for irrigating plants is next provided. The watering assembly is supported by the system.

Lastly, an illumination assembly 88 is provided. The illumination assembly promotes the growth of plants supported by the system.

In alternate embodiments of the invention the transportation assembly has one or any plurality of wheels.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A vertically oriented portable planter system 10 for growing plants 12 in soil 14, for tilting the system between growing and planting orientations, and for transporting the system between various locations, the system comprising, in combinations:

a left side (18) and a similarly configured right side (20), each side having a top edge (22), a bottom edge (24), a front edge (26), a rear edge (28), a first surface (30) and a second surface (32), a vertical recess (34) in the first and second surfaces of each side adjacent to the rear edge, each vertical recess having a plurality of pairs of elevationally spaced aligned holes (36), a plurality of elevationally spaced, parallel, angled recesses (38) in the first and second surfaces of each side adjacent to the rear edges, each angled recess having a pair of laterally spaced aligned holes (40), each side being a laminate formed of an interior component with apertures and exterior components with apertures and recesses;

a rear plate assembly formed of a plurality of rear plates (44B) coupled together in a common vertical plane between the sides adjacent to the rear edges to hold the sides in parallel vertical planes;

a shelf plate assembly formed of a plurality of shelf plates (44S) coupled in elevationally spaced parallel planes between the sides to hold the sides in parallel vertical planes, the shelf plates extending from adjacent to the rear edges forwardly and upwardly at an acute angle to the front edges, each of the plurality of rear plates and each of the plurality of shelf plates being of an identical construction formed with laterally spaced end edges with two threaded projections (46) extending through the apertures of the recesses and secured with multi-functional nuts (48), and each of the plurality of rear plates and each of the plurality of shelf plates also having a lip (50) protruding from an edge between the end edges, the shelf plates being spaced from the rear plates for the flow of water there between;

a base (54) having a bottom (56) and a top (58), the bottom positionable on a floor, the top receiving and supporting the sides adjacent to the bottom edges, lower apertures (60) extending through the base and the sides with bolts (62) extending there through and with multi-functional nuts (48) for securement there between;

horizontal shelving (68) with upwardly extending projections (70) for storage of gardening tools, a drain member (72) extending through the horizontal shelving;

a transportation assembly formed of a pair of laterally spaced front casters (76) and a pair of laterally spaced rear casters (78), the front and rear casters including wheels rotatably coupled to the base and extending beneath the base, the rear casters including brakes (80);

a watering assembly (84) for irrigating plants supported by the system; and an illumination assembly (88) for promoting growth of plants supported by the system.

\* \* \* \* \*